US012737868B2

(12) United States Patent
Niu et al.

(10) Patent No.: US 12,737,868 B2
(45) Date of Patent: Sep. 15, 2026

(54) DEFECT DETECTION METHOD, DEVICE AND SYSTEM

(71) Applicant: CONTEMPORARY AMPEREX TECHNOLOGY (HONG KONG) LIMITED, Hong Kong (CN)

(72) Inventors: Maolong Niu, Ningde (CN); Qiangwei Huang, Ningde (CN); Jintan Xie, Ningde (CN); Yongfa Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 344 days.

(21) Appl. No.: 18/465,557

(22) Filed: Sep. 12, 2023

(65) Prior Publication Data

US 2023/0419472 A1 Dec. 28, 2023

Related U.S. Application Data

(63) Continuation of application No. PCT/CN2021/128893, filed on Nov. 5, 2021.

(51) Int. Cl.
*G06T 7/00* (2017.01)
*G06T 7/11* (2017.01)

(52) U.S. Cl.
CPC .............. *G06T 7/0004* (2013.01); *G06T 7/11* (2017.01); *G06T 2207/20021* (2013.01); *G06T 2207/20084* (2013.01); *G06T 2207/30108* (2013.01)

(58) Field of Classification Search
CPC ..................... G06T 7/0004; G06T 7/11; G06T 2207/20021; G06T 2207/20084; G06T 2207/30108
See application file for complete search history.

(56) References Cited

U.S. PATENT DOCUMENTS

2008/0037897 A1 2/2008 Chiang et al.
2009/0022417 A1 1/2009 Reid
2021/0174489 A1 6/2021 Liu et al.

FOREIGN PATENT DOCUMENTS

CN 103499585 A 1/2014
CN 109377485 A 2/2019
(Continued)

OTHER PUBLICATIONS

Decision to Grant a Patent for JP application No. 2023-552290, dated Jul. 25, 2024.
(Continued)

*Primary Examiner* — Vu Le
*Assistant Examiner* — Matthew James Bodnark
(74) *Attorney, Agent, or Firm* — Ladas & Parry, LLP

(57) ABSTRACT

A defect detection method includes: obtaining an average grayscale value of an image; constructing a mapping table, where elements of the mapping table include a mapped value corresponding to each grayscale value within a grayscale value range of the image, a mapped value corresponding to a grayscale value greater than or equal to a reference value is a first value, a mapped value corresponding to a grayscale value less than the reference value is a second value, and the reference value is an absolute value of a difference between the average grayscale value and a preset grayscale value; searching for a mapped value corresponding to a grayscale value of each pixel in the image from the mapping table; segmenting the image to obtain a suspicious defect sub-image based on the mapped value corresponding to the grayscale value of each pixel; and inputting the suspicious defect sub-image into a machine learning model.

20 Claims, 5 Drawing Sheets

(56) References Cited

FOREIGN PATENT DOCUMENTS

| | | | | | |
|---|---|---|---|---|---|
| CN | 109472783 A | | 3/2019 | | |
| CN | 110288566 A | * | 9/2019 | ........... | G06T 7/0002 |
| CN | 111982916 A | | 11/2020 | | |
| CN | 112598647 A | | 4/2021 | | |
| CN | 113592828 A | * | 8/2021 | ........... | G06F 18/241 |
| CN | 113538603 A | | 10/2021 | | |
| JP | H0915165 A | | 1/1997 | | |
| JP | 2001077165 A | | 3/2001 | | |
| JP | 2020187657 A | | 11/2020 | | |

OTHER PUBLICATIONS

International Search Report for International Application PCT/CN2021/128893, mailed Jul. 20, 2022.
Written Opinion of International Search Authority for International Application PCT/CN2021/128893, mailed Jul. 20, 2022.
Extended European Search Report for EP application No. 21962919.3, dated Mar. 29, 2024.
Office action from corresponding Chinese Patent Application No. 202180053074.X dated Nov. 4, 2025, with search report.

* cited by examiner

DEFECT DETECTION METHOD, DEVICE AND SYSTEM

CROSS REFERENCE TO RELATED APPLICATION

This application is a continuation of International Patent Application No. PCT/CN2021/128893, filed on Nov. 5, 2021, which is incorporated by reference in its entirety.

TECHNICAL FIELD

The present application relates to the technical field of defect detection, and in particular, to a defect detection method, apparatus, and system.

BACKGROUND

In industrial production, a defect of an object affects the performance of the object and finally leads to unqualified quality of the object. Therefore, it is necessary to perform defect detection on the object.

SUMMARY

It is noticed that in the related art, a defect detection speed is relatively low.

Embodiments of the present application provide a defect detection method, apparatus, or system, which can increase a defect detection speed.

In a first aspect, the present application provides a defect detection method, including: obtaining an average grayscale value of an image of an object to be detected; constructing a mapping table, where elements of the mapping table comprise a mapped value corresponding to each grayscale value within a grayscale value range of the image, a mapped value corresponding to a grayscale value greater than or equal to a reference value is a first value, a mapped value corresponding to a grayscale value less than the reference value is a second value, and the reference value is an absolute value of a difference between the average grayscale value and a preset grayscale value; searching for a mapped value corresponding to a grayscale value of each pixel in the image from the mapping table; segmenting the image to obtain at least one suspicious defect sub-image based on the mapped value corresponding to the grayscale value of each pixel, where a mapped value corresponding to a grayscale value of each pixel in each suspicious defect sub-image is the first value; and inputting the at least one suspicious defect sub-image into a machine learning model to obtain a defect detection result.

In the technical solution of this embodiment of the present application, after the average grayscale value of the image is obtained, the mapping table is constructed based on the average grayscale value of the image and the grayscale value range of the image. Subsequently, the mapped value corresponding to the grayscale value of each pixel in the image only needs to be searched for from the mapping table without mathematical calculation, which improves the defect detection speed. In addition, the suspicious defect sub-image is used as an input to the machine learning model, instead of using, as the input, the entire image of the object to be processed, which also helps to improve the defect detection speed.

In some embodiments, the obtaining an average grayscale value of an image of an object to be detected includes: obtaining an original grayscale value range of the image; and performing contrast stretching on the image to expand the original grayscale value range to the grayscale value range, where the average grayscale value is an average grayscale value of the image after being subjected to the contrast stretching. By contrast stretching, a difference in grayscales between a defect region and a non-defect region is increased. In this way, the robustness and accuracy of segmentation of a suspicious defect sub-region are improved, thereby improving the robustness and accuracy of defect detection while increasing the defect detection speed.

In some embodiments, the performing contrast stretching on the image includes: converting the original grayscale value $I1(x,y)$ of each pixel in the image into a grayscale value $I2(x,y)$ according to the following formula:

$$I2(x, y) = \begin{cases} c, & I1(x, y) < a \\ d, & I1(x, y) > b \\ \dfrac{I1(x, y) - a}{b - a} \cdot (d - c), & a \le I1(x, y) \le b \end{cases}$$

where a is a lower limit of the original grayscale value range, b is an upper limit of the original grayscale value range, c is a lower limit of the grayscale value range, and d is an upper limit of the grayscale value range.

In some embodiments, the first value is d, and the second value is c. In this way, the success rate of segmentation of the suspicious defect sub-image can be improved.

In some embodiments, c=0, and d=255. In this way, the success rate of segmentation of the suspicious defect sub-image can be further improved.

In some embodiments, the machine learning model includes a residual neural network model, and a total number of convolutional layers and fully connected layers in the residual neural network model is 14. In this way, the defect detection accuracy can be improved.

In some embodiments, a difference between a maximum original grayscale value and a minimum original grayscale value of a non-defect region, other than the defect, in the image ranges from 35 to 50. In this way, the defect detection accuracy can be further improved.

In some embodiments, the difference between the maximum original grayscale value and the minimum original grayscale value is 40. In this way, the defect detection accuracy can be further improved.

In some embodiments, the maximum original grayscale value is 105, and the minimum original grayscale value is 75. In this way, the defect detection accuracy can be further improved.

In some embodiments, the segmenting the image to obtain at least one suspicious defect sub-image based on the mapped value corresponding to the grayscale value of each pixel includes: segmenting the image to obtain a plurality of connected regions based on the mapped value corresponding to the grayscale value of each pixel, where a mapped value corresponding to a grayscale value of each pixel in each connected region is the first value; in a case where two adjacent connected regions satisfy a preset condition, combining the two connected regions into a suspicious defect sub-image, where areas of the two connected regions are respectively a first area and a second area less than or equal to the first area, an area of an overlapped region of the two connected regions is a third area, and the preset condition includes a ratio of the third area to the first area being greater than a preset ratio; and in a case where the two connected regions do not satisfy the preset condition, determining the two connected regions as two suspicious defect sub-images.

In these embodiments, in the segmentation process of the suspicious defect sub-image, if a ratio of an area of an overlapped region of two adjacent connected regions to an area of a larger connected region is greater than a preset ratio, the two connected regions are combined into a suspicious defect sub-image. Otherwise, the two connected regions are used as two suspicious defect sub-images. In this way, the number of suspicious defect sub-images can be reduced, and the speed at which the machine learning model obtains a defect detection result can be increased, thereby further increasing the defect detection speed.

In some embodiments, the preset ratio is greater than 0.5 and less than 1. In this way, the number of suspicious defect sub-images can be reduced, and the accuracy of the suspicious defect sub-images can also be ensured.

In some embodiments, the preset ratio is 0.8. In this way, the number of suspicious defect sub-images can be reduced, and the accuracy of the suspicious defect sub-images can also be better ensured.

In some embodiments, a data type of an element in the mapping table is an unsigned char type.

In some embodiments, the defect detection result includes a defect type. In this way, the defect detection result is more accurate.

In some embodiments, the object to be detected includes an electrode plate of a battery. In the case where the object to be detected is an electrode plate of a battery, the speed of defect detection for the electrode plate of the battery can be improved by using the above defect detection solution.

In some embodiments, the battery includes a lithium battery. In the case where the object to be detected is an electrode plate of a lithium battery, the speed of defect detection for the electrode plate of the lithium battery can be improved by using the above defect detection solution.

In a second aspect, the present application provides a defect detection apparatus, including: an obtaining module configured to obtain an average grayscale value of an image of an object to be detected; a construction module configured to construct a mapping table, where elements of the mapping table comprise a mapped value corresponding to each grayscale value within a grayscale value range of the image, a mapped value corresponding to a grayscale value greater than or equal to a reference value is a first value, a mapped value corresponding to a grayscale value less than the reference value is a second value, and the reference value is an absolute value of a difference between the average grayscale value and a preset grayscale value; a search module configured to search for a mapped value corresponding to a grayscale value of each pixel in the image from the mapping table; a segmentation module configured to segment the image to obtain at least one suspicious defect sub-image based on the mapped value corresponding to the grayscale value of each pixel, where a mapped value corresponding to a grayscale value of each pixel in each suspicious defect sub-image is the first value; and an input module configured to input the at least one suspicious defect sub-image into a machine learning model to obtain a defect detection result. After the average grayscale value of the image is obtained, the mapping table is constructed based on the average grayscale value of the image and the grayscale value range of the image. Subsequently, the mapped value corresponding to the grayscale value of each pixel in the image only needs to be searched for from the mapping table without mathematical calculation, which improves the defect detection speed. In addition, the suspicious defect sub-image is used as an input to the machine learning model, instead of using, as the input, the entire image of the object to be processed, which also helps to improve the defect detection speed.

In a third aspect, the present application provides a defect detection apparatus, including: a memory; and a processor coupled to the memory and configured to execute, based on instructions stored in the memory, the defect detection method as described in any one of the above embodiments.

In a fourth aspect, the present application provides a defect detection system, including: a defect detection apparatus as described in any one of the above embodiments; and an imaging apparatus configured to scan an object to be detected, to obtain an image.

In a fifth aspect, the present application provides a computer-readable storage medium, including computer program instructions, where when the computer program instructions are executed by a processor, the defect detection method as described in any one of the above embodiments is implemented.

In a sixth aspect, the present application provides a computer program product, including a computer program, where when the computer program is executed by a processor, the defect detection method as described in any one of the above embodiments is implemented.

BRIEF DESCRIPTION OF THE DRAWINGS

In order to illustrate the technical solutions of the embodiments of the present application more clearly, the accompanying drawings required in the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

DETAILED DESCRIPTION

Figure 1:
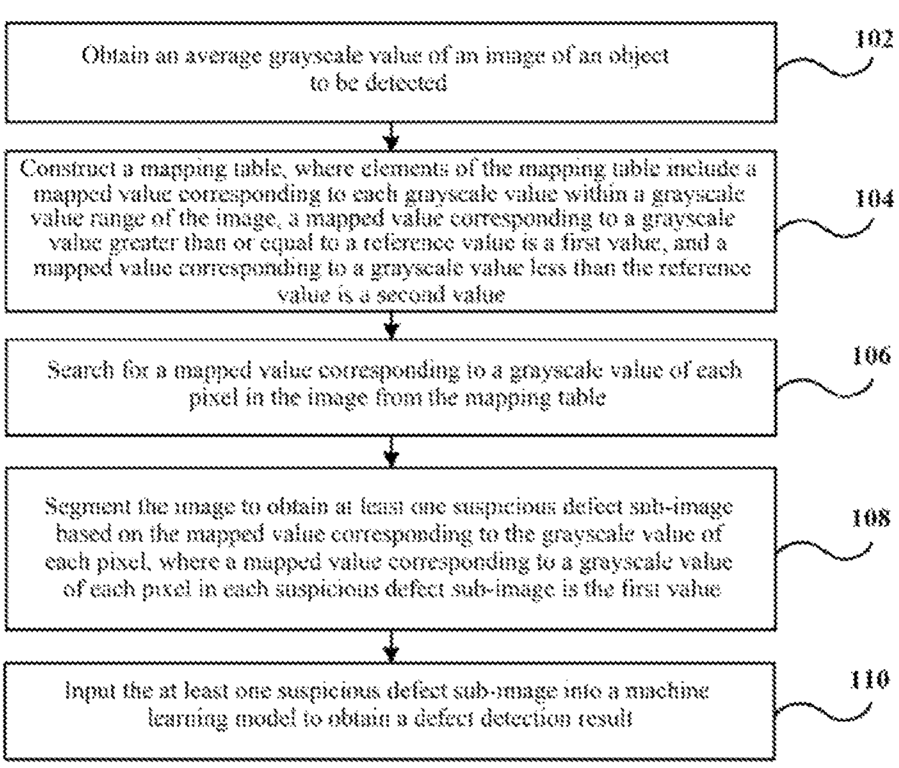
FIG. 1 is a schematic flowchart of a defect detection method according to an embodiment of the present application.

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "multiple" means two or more, unless otherwise specified. In addition, the terms "first", "second", "third", etc. are used for descriptive purposes only, and should not be construed as indicating or implying the relative importance.

Relative arrangements, numerical expressions, and numerical values of components and steps set forth in these embodiments do not limit the scope of the present disclosure, unless otherwise specifically stated.

Technologies, methods, and devices known to those of ordinary skill in the related art may not be discussed in detail, but where appropriate, the technologies, methods, and devices should be considered as part of the authorized specification.

In all examples shown and discussed herein, any specific value should be construed as illustration only, instead of limitation. Therefore, there may be different values in other examples of exemplary embodiments.

It should be noted that similar reference numerals and letters represent similar items in the following figures. Therefore, once an item is defined in one figure, the item does not need to be further discussed in subsequent figures.

In view of the problem of a low defect detection speed, it is found after analysis that in a related-art method, a preprocessing process of an image of an object takes a relatively long time.

It is found after further analysis that in the preprocessing process, a grayscale value of each pixel in the image requires a complex mathematical calculation process (for example, subtraction, absolute value, comparison, etc.) to determine whether the pixel is a suspicious defect. This causes the preprocessing process of the image to take a relatively long time, resulting in a relatively low defect detection speed. When the image has a very large size, the preprocessing process may take an even longer time.

In view of this, the embodiments of the present application propose the following technical solutions to improve the defect detection speed.

FIG. 1 is a schematic flowchart of a defect detection method according to an embodiment of the present application. As shown in FIG. 1, the defect detection method includes steps 102 to 110.

In step 102, an average grayscale value of an image of an object to be detected is obtained.

Herein, the image may be an image of a surface of the object to be detected. In some embodiments, the object to be detected includes an electrode plate of a battery, for example, an electrode plate of a lithium battery. The image may be an image of a surface of the electrode plate. However, it should be understood that this embodiment of the present application is not limited thereto, and the object to be detected may also be other workpieces.

As some implementations, the average grayscale value of the image is an average grayscale value of original grayscales of the image. As some other implementations, the average grayscale value of the image is an average grayscale value of grayscale values obtained after performing contrast stretching on original grayscales, and will be described below in detail in conjunction with some embodiments.

In step 104, a mapping table is constructed, where elements of the mapping table include a mapped value corresponding to each grayscale value within a grayscale value range of the image.

For convenience of description, an absolute value of a difference between the average grayscale value of the image and a preset grayscale value is referred to as a reference value. In the mapping table, a mapped value corresponding to a grayscale value greater than or equal to the reference value is a first value, and a mapped value corresponding to a grayscale value less than the reference value is a second value.

For example, the grayscale value range of the image is from 0 to 255. For each grayscale value from 0 to 255, a corresponding mapped value is assigned in the mapping table, that is, there are a total of 266 mapped values corresponding to the grayscale values in the mapping table. Assuming that the reference value is 100, a mapped value corresponding to each grayscale value from 100 to 255 is the first value, and a mapped value corresponding to each grayscale value from 0 to 99 is the second value. It should be understood that the second value is different from the first value.

It can be understood that the preset grayscale value is a reference of degree to which the grayscale value of each pixel in the image deviates from the average grayscale value, and a specific value of the preset grayscale value may be set according to actual situations.

In some embodiments, a data type of an element in the mapping table is an unsigned char type.

In step 106, a mapped value corresponding to a grayscale value of each pixel in the image is searched for from the mapping table.

The reference value 100 is still used as an example. If a grayscale value of a pixel is 80, it is found from the mapping table that a corresponding mapped value is the second value (for example, 0); and if a grayscale value of a pixel is 120, it is found from the mapping table that a corresponding mapped value is the first value (for example, 255). By traversing each pixel in the image, the mapped value corresponding to the grayscale value of each pixel can be directly found from the mapping table.

In step 108, the image is segmented to obtain at least one suspicious defect sub-image based on the mapped value corresponding to the grayscale value of each pixel.

Herein, a mapped value corresponding to a grayscale value of each pixel in each suspicious defect sub-image is the first value. In other words, an absolute value of a difference between the grayscale value of each pixel in each suspicious defect sub-image and an average grayscale value of the entire image is greater than the preset grayscale value.

In step 110, the at least one suspicious defect sub-image is input into a machine learning model to obtain a defect detection result.

It should be understood that the at least one suspicious defect sub-image herein is obtained in step 108. When only one suspicious defect sub-image is obtained in step 108, the suspicious defect sub-image is inputted into the machine learning model. When a plurality of suspicious defect sub-images are obtained in step 108, the obtained plurality of suspicious defect sub-images are input into the machine learning model.

It should also be understood that by using different sample images as an input and different detection results as an output to train the machine learning model, the machine learning model can obtain the defect detection result according to the suspicious defect sub-image. For example, a sample defect image is used as an input and a defect type of the sample defect image is used as an output to train the machine learning model. For another example, sample non-defect images are used as an input and a non-defect result is used as an output to train the machine learning model.

In some embodiments, the machine learning model includes, but is not limited to, a residual neural network model.

In some embodiments, the defect detection result indicates non-defective. In some other embodiments, the defect detection result indicates defective. In some embodiments, when the defect detection result indicates defective, the defect detection result further includes a defect type. An electrode plate of a battery is used as an example. The defect type may include but is not limited to: metal leakage, crack, dark spot, bubble, pit, unknown, etc.

In the above embodiment, after the average grayscale value of the image is obtained, the mapping table is constructed based on the average grayscale value of the image and the grayscale value range of the image. Subsequently, the mapped value corresponding to the grayscale value of each pixel in the image only needs to be searched for from the mapping table without mathematical calculation, which improves the defect detection speed. In addition, the suspicious defect sub-image is used as an input to the machine learning model, instead of using, as the input, the entire image of the object to be processed, which also helps to improve the defect detection speed.

Figure 2:
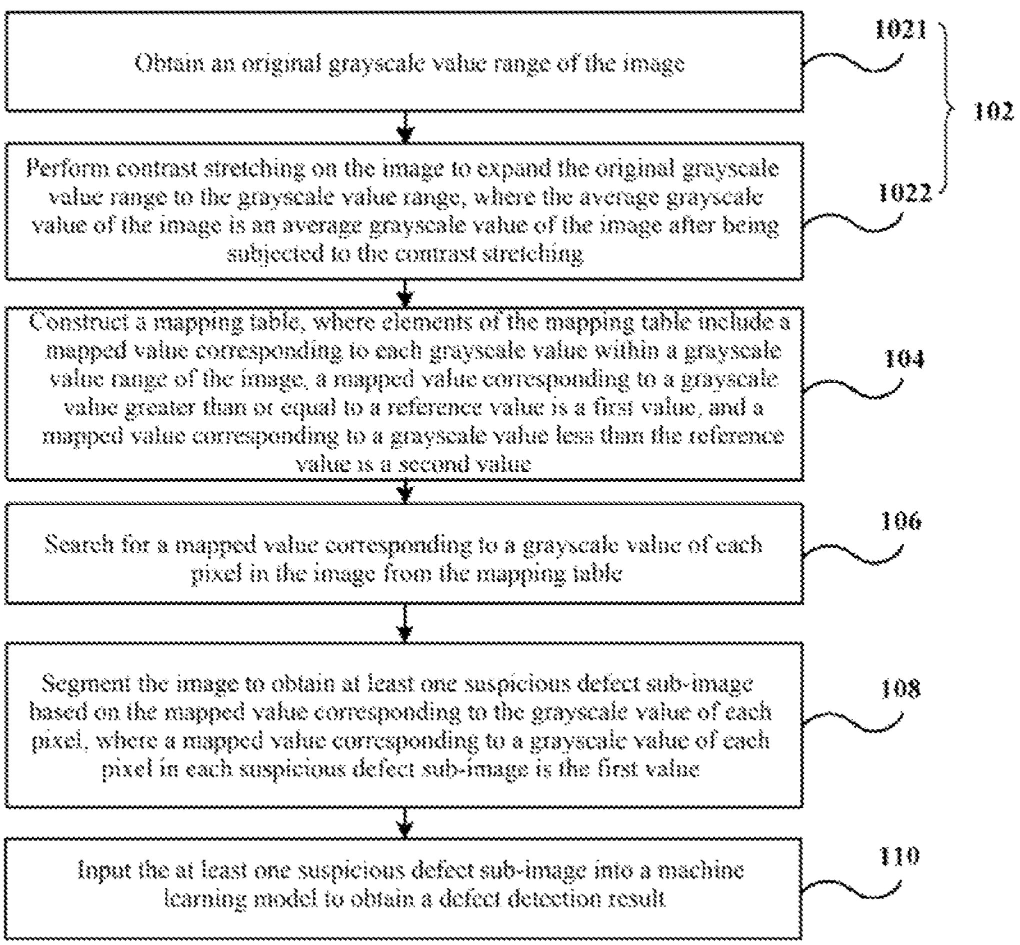
FIG. 2 is a schematic flowchart of a defect detection method according to another embodiment of the present application.

FIG. 2 is a schematic flowchart of a defect detection method according to another embodiment of the present application.

As shown in FIG. 2, the defect detection method includes steps 102 to 110, and step 102 includes steps 1021 and 1022. Only an implementation process of some steps (for example, steps 1021 and 1022) will be emphasized below, and for other steps, reference may be made to the description of the embodiment shown in FIG. 1.

In step 1021, an original grayscale value range of the image is obtained.

For example, the image of the object to be detected may be obtained by scanning and imaging the surface of the object to be detected, and the grayscale value range of the image is the original grayscale value range.

An electrode plate of a lithium battery is used as an example. By controlling light intensity to be constant, a change range of the original grayscale of the image of a surface of the electrode plate may be obtained. It can be understood that a normal region on the surface of the electrode plate is smooth, and a surface texture and color are consistent. If the surface of the entire electrode plate is evenly illuminated, closer grayscale values of normal regions of the image are obtained.

In step 1022, contrast stretching is performed on the image to expand the original grayscale value range to the grayscale value range. Herein, the average grayscale value of the image is an average grayscale value of the image after being subjected to the contrast stretching.

In some embodiments, contrast stretching may be performed on the image in the following manner:

converting the original grayscale value I1 (x,y) of each pixel in the image into a grayscale value I2(x,y) according to the following formula:

$$I2(x, y) = \begin{cases} c, & I1(x, y) < a \\ d, & I1(x, y) > b \\ \dfrac{I1(x, y) - a}{b - a} \cdot (d - c), & a \le I1(x, y) \le b \end{cases}$$

In the above formula, a is a lower limit of the original grayscale value range, b is an upper limit of the original grayscale value range, c is a lower limit of the grayscale value range after contrast stretching, and d is an upper limit of the grayscale value range after contrast stretching. In some embodiments, c=0, and d=255, such that the contrast of the image can be increased as much as possible.

In step 104, a mapping table is constructed, where elements of the mapping table include a mapped value corresponding to each grayscale value within a grayscale value range of the image. In the mapping table, a mapped value corresponding to a grayscale value greater than or equal to the reference value is a first value, and a mapped value corresponding to a grayscale value less than the reference value is a second value.

In some embodiments, the first value is the upper limit d of the grayscale value range after contrast stretching, for example, 255; and the second value is the lower limit c of the grayscale value range after contrast stretching, for example, 0. In this way, the success rate of subsequent segmentation of the suspicious defect sub-image can be improved.

In step 106, a mapped value corresponding to a grayscale value of each pixel in the image is searched for from the mapping table.

In step 108, the image is segmented to obtain at least one suspicious defect sub-image based on the mapped value corresponding to the grayscale value of each pixel.

In step 110, the at least one suspicious defect sub-image is input into a machine learning model to obtain a defect detection result.

In the above embodiment, a difference in grayscales between a defect region and a non-defect region is increased by contrast stretching. In this way, the robustness and accuracy of segmentation of a suspicious defect sub-region are improved, thereby improving the robustness and accuracy of defect detection while increasing the defect detection speed.

Figure 3:
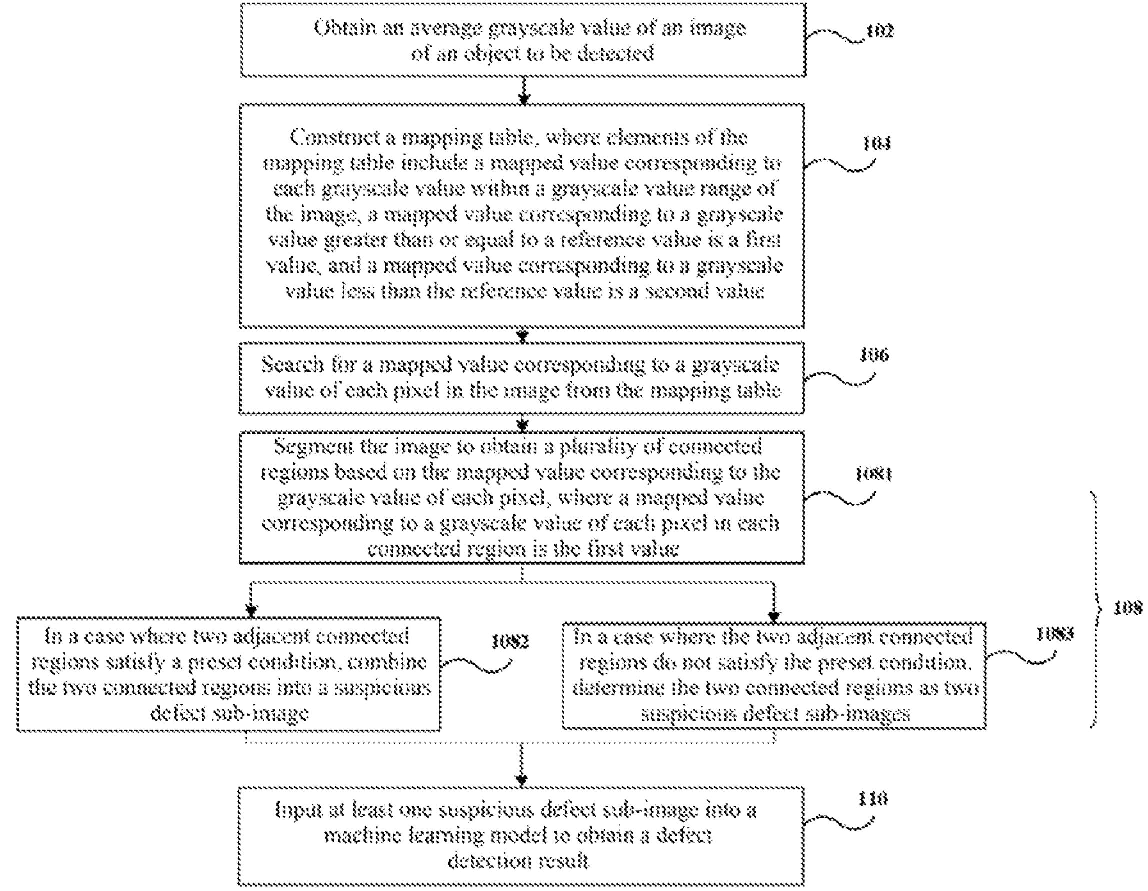
FIG. 3 is a schematic flowchart of a defect detection method according to still another embodiment of the present application.

FIG. 3 is a schematic flowchart of a defect detection method according to still another embodiment of the present application.

As shown in FIG. 3, the defect detection method includes steps 102 to 110, and step 108 includes steps 1081 to 1083. Only an implementation process of some steps (for example, steps 1081 to 1083) will be emphasized below, and for other steps, reference may be made to the description of the embodiment shown in FIG. 1.

In step 102, an average grayscale value of an image of an object to be detected is obtained.

In some implementations, step 102 may include steps 1021 and 1022 shown in FIG. 2.

In step 104, a mapping table is constructed, where elements of the mapping table include a mapped value corresponding to each grayscale value within a grayscale value range of the image. In the mapping table, a mapped value corresponding to a grayscale value greater than or equal to the reference value is a first value, and a mapped value corresponding to a grayscale value less than the reference value is a second value.

In step 106, a mapped value corresponding to a grayscale value of each pixel in the image is searched for from the mapping table.

In step 1081, the image is segmented to obtain a plurality of connected regions based on the mapped value corresponding to the grayscale value of each pixel, where a mapped value corresponding to a grayscale value of each pixel in each connected region is the first value.

For example, through connected component analysis, the image may be segmented to obtain a plurality of rectangular connected regions. In each connected region, the absolute value of the difference between the grayscale value of each pixel and the average grayscale value of the image is greater than the preset grayscale value. In other words, each connected region may be a defect region.

In step 1082, in a case where two adjacent connected regions satisfy a preset condition, the two connected regions are combined into a suspicious defect sub-image.

For ease of description, areas of the two adjacent connected regions are respectively referred to as a first area and a second area, and an area of an overlapped region of the two adjacent connected regions is referred to as a third area. The second area is less than or equal to the first area, that is, the areas of the two adjacent connected regions may be the same or different. The preset condition includes a ratio of the third area to the first area being greater than a preset ratio.

In step 1083, in a case where the two adjacent connected regions do not satisfy the preset condition, the two connected regions are determined as two suspicious defect sub-images.

In some embodiments, the preset ratio is greater than 0.5 and less than 1, for example, the preset ratio is 0.8. In this way, connected regions whose overlapping ratio is less than or equal to 0.5 are not combined, so that the number of suspicious defect sub-images can be reduced, and the accuracy of the suspicious defect sub-image can also be ensured.

Through steps 1082 and 1083, the connected regions that satisfy the preset condition are combined into a suspicious defect sub-image, and each connected region that does not satisfy the preset condition is used as a suspicious defect sub-image. In this way, at least one suspicious defect sub-image is obtained.

In step 110, the at least one suspicious defect sub-image is input into a machine learning model to obtain a defect detection result.

In the above embodiment, in the segmentation process of the suspicious defect sub-image, if a ratio of an area of an overlapped region of two adjacent connected regions to an area of a larger connected region is greater than a preset ratio, the two connected regions are combined into a suspicious defect sub-image. Otherwise, the two connected regions are used as two suspicious defect sub-images. In this way, the number of suspicious defect sub-images can be reduced, and the speed at which the machine learning model obtains a defect detection result can be increased, thereby further increasing the defect detection speed.

In some embodiments, a preprocessing time in the steps before step 110 is not greater than 80 ms.

When defect detection is performed in the manners in the above embodiments, a solution has been found to improve both the defect detection speed and the defect detection accuracy. It is noticed that when the machine learning model includes a residual neural network model, the defect detection accuracy may change accordingly by adjusting a total number of convolutional layers and fully connected layers in the residual neural network model.

In some embodiments, a total number of convolutional layers and fully connected layers in the residual neural network model is 14. In this way, both the defect detection speed and the defect detection accuracy can be improved.

It is also noticed that when the grayscale value of the non-defect region, other than the defect, in the image of the object to be detected changes within different ranges, the defect detection result obtained by performing defect detection using the residual neural network model with a total number of 14 convolutional layers and fully connected layers presents different accuracies.

In some embodiments, a difference between a maximum original grayscale value and a minimum original grayscale value of a non-defect region, other than the defect, in the image of the object to be detected ranges from 35 to 50. In this case, the defect detection result obtained by performing defect detection using the residual neural network model with a total number of 14 convolutional layers and fully connected layers is more accurate.

In some embodiments, the difference between the maximum original grayscale value of the non-defect region and the minimum original grayscale value of the non-defect region is 40. For example, the grayscale value of the non-defect region ranges from 75 to 105, that is, the maximum original grayscale value of the non-defect region is 105, and the minimum original grayscale value of the non-defect region is 75. In this case, the defect detection result obtained by performing defect detection using the residual neural network model with a total number of 14 convolutional layers and fully connected layers is even more accurate.

Figure 4:
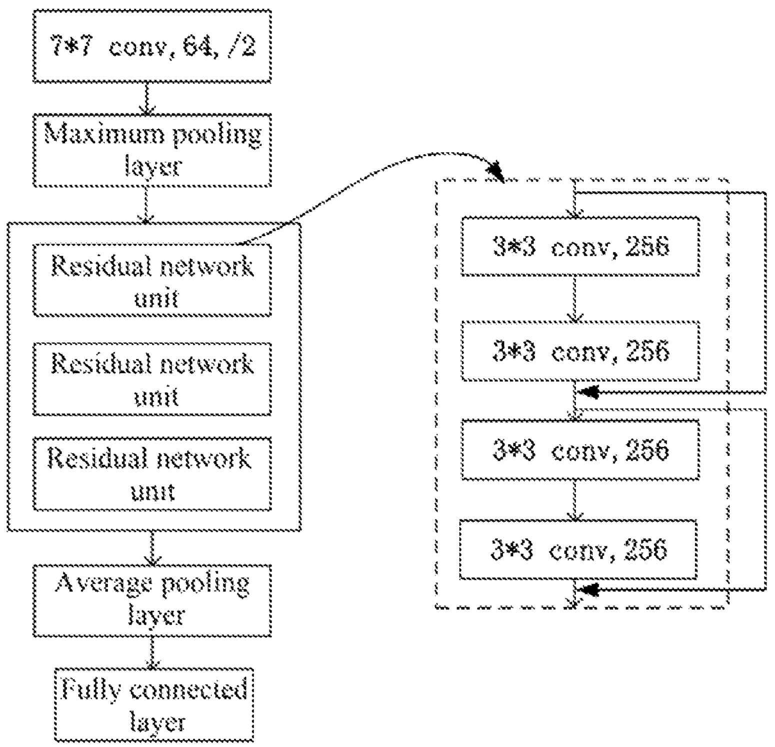
FIG. 4 is a schematic diagram of a residual neural network model according to an embodiment of the present application.

FIG. 4 is a schematic diagram of a residual neural network model according to an embodiment of the present application.

As shown in FIG. 4, the residual neural network model includes three residual network units (ResNet Unit) located between a maximum pooling layer and an average pooling layer. Each residual network unit includes two residual blocks, and each residual block includes two convolutional layers. In addition, the residual neural network model further includes the first convolutional layer located before the maximum pooling layer and a fully connected layer located after the average pooling layer.

In some embodiments, a convolution kernel of the first convolutional layer has a size of 7*7, a number of convolution kernels is 64, and a size of an image becomes ½ of an original size after the image passes through the first convolutional layer. In some embodiments, a size of an image becomes ½ of an original size after the image passes through the maximum pooling layer. In some embodiments, a convolution kernel of each convolutional layer in each residual network unit has a size of 3*3, a number of convolution kernels is 256, and a size of an image does not change after the image passes through each convolutional layer in the residual network unit.

In some embodiments, the residual neural network model uses the following loss function during training:

$$\text{focal loss}=-\alpha(1-y')^{\gamma}\log(y')$$

In the above formula, focal loss is a loss function, y' is a probability of a specific category, $\alpha$ is a weight of the category, and $\gamma$ is a modulation factor.

The residual neural network model shown in FIG. 4 may be implemented by removing one residual network unit from the ResNet18 model. The residual neural network model shown in FIG. 4 may also be referred to as a ResNet14 model.

In some embodiments, compared with the ResNet18 model, the ResNet14 model is reduced by 75% in size, increased by 25% in defect detection speed, and increased by 5% in defect detection accuracy. In some embodiments, an inference time of the ResNet14 model is not greater than 20 ms. In addition, the use of the ResNet14 model helps to implement the classification of defects with a low probability (0.1%) and reduce the possibility of missed detection.

The embodiments in this description are all described in a progressive manner. Each embodiment focuses on the differences from other embodiments, and for the same or similar parts among the embodiments, reference may be made to each other. An apparatus embodiment substantially corresponds to a method embodiment, and is thus described briefly. For related parts, reference may be made to partial descriptions in the method embodiment.

Figure 5:
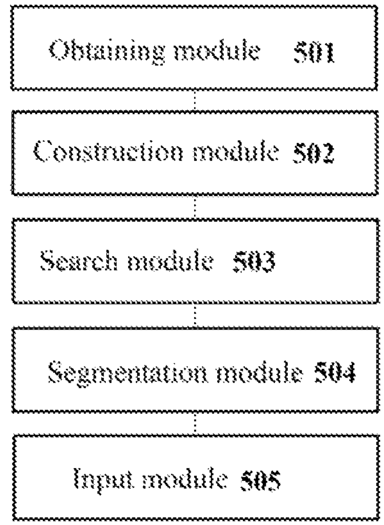
FIG. 5 is a schematic diagram of a defect detection apparatus according to an embodiment of the present application.

FIG. 5 is a schematic diagram of a defect detection apparatus according to an embodiment of the present application.

As shown in FIG. 5, the defect detection apparatus includes an obtaining module 501, a construction module 502, a search module 503, a segmentation module 504, and an input module 505.

The obtaining module 501 is configured to obtain an average grayscale value of an image of an object to be detected.

The construction module 502 is configured to construct a mapping table, where elements of the mapping table include a mapped value corresponding to each grayscale value within a grayscale value range of the image. Herein, an absolute value of a difference between the average grayscale value and a preset grayscale value is a reference value, a mapped value corresponding to a grayscale value greater than or equal to the reference value is a first value, and a mapped value corresponding to a grayscale value less than the reference value is a second value.

The search module 503 is configured to search for a mapped value corresponding to a grayscale value of each pixel in the image from the mapping table.

The segmentation module 504 is configured to segment the image to obtain at least one suspicious defect sub-image based on the mapped value corresponding to the grayscale value of each pixel. Herein, a mapped value corresponding to a grayscale value of each pixel in each suspicious defect sub-image is the first value.

The input module 505 is configured to input the at least one suspicious defect sub-image into a machine learning model to obtain a defect detection result.

In the above embodiment, after the average grayscale value of the image is obtained, the mapping table is constructed based on the average grayscale value of the image and the grayscale value range of the image. Subsequently, the mapped value corresponding to the grayscale value of each pixel in the image only needs to be searched for from the mapping table without mathematical calculation, which greatly improves the defect detection speed.

In some embodiments, the obtaining module 501 is configured to obtain, in the manner described above, the average grayscale value of the image of the object to be detected. In some embodiments, the segmentation module 504 is configured to segment the image in the manner described above, to obtain at least one suspicious defect sub-image.

Figure 6:
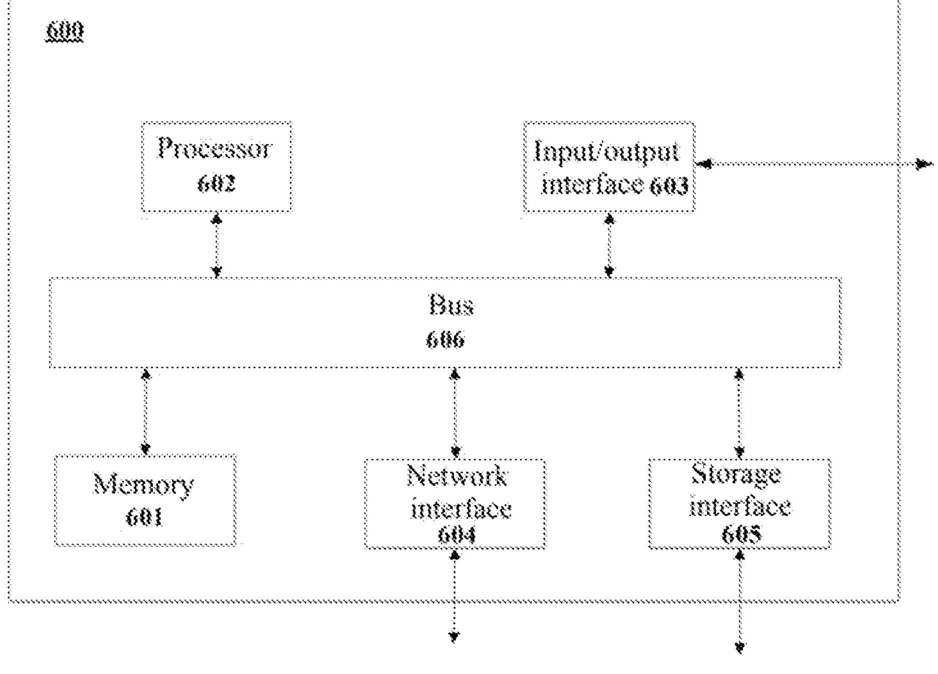
FIG. 6 is a schematic diagram of a defect detection apparatus according to another embodiment of the present application.

FIG. 6 is a schematic diagram of a defect detection apparatus according to another embodiment of the present application.

As shown in FIG. 6, the defect detection apparatus 600 includes a memory 601 and a processor 602 coupled to the memory 601. The processor 602 is configured to execute, based on instructions stored in the memory 601, the method as described in any one of the foregoing embodiments.

The memory 601 may include, for example, a system memory, a fixed non-volatile storage medium, etc. The system memory may store, for example, an operating system, an application program, a boot loader, other programs, etc.

The defect detection apparatus 600 may further include an input/output interface 603, a network interface 604, a storage interface 605, etc. These interfaces 603, 604, and 605 may be connected and the memory 601 and the processor 602 may be connected, for example, via a bus 606. The input/output interface 603 provides a connection interface for input and output devices such as a display, a mouse, a keyboard, and a touch screen. The network interface 604 provides a connection interface for various networked devices. The storage interface 605 provides a connection interface for external storage devices such as an SD card and a USB flash disk.

In some embodiments, the defect detection apparatus is further configured to upload a defect detection result to a data platform and/or upload, to a defect image library, a suspicious defect sub-image for which a defect detection result indicates defective. During subsequent training of the machine learning model, the images in the image library may be used as training samples, thereby improving the accuracy of subsequent defect detection by the machine learning model.

Figure 7:
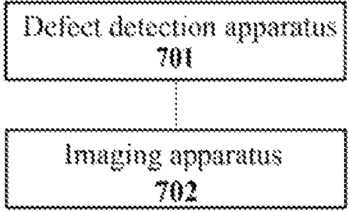
FIG. 7 is a schematic diagram of a defect detection system according to an embodiment of the present application.

FIG. 7 is a schematic diagram of a defect detection system according to an embodiment of the present application.

As shown in FIG. 7, the defect detection system includes a defect detection apparatus 701 as described in any one of the above embodiments and an imaging apparatus 702.

The imaging apparatus 702 is configured to scan an object to be detected, to obtain an image of the object to be detected. In some embodiments, the imaging apparatus 702 is a line scan camera. The defect detection apparatus 701 obtains, from the imaging apparatus 702, the image of the object to be detected, and performs defect detection in the manner described above. After a defect detection result is obtained, a marking machine may be used to mark a defect in the object to be detected.

An embodiment of the present application further provides a computer-readable storage medium including computer program instructions, where when the computer program instructions are executed by a processor, the method as described in any one of the above embodiments is implemented.

An embodiment of the present application further provides a computer program product including a computer program, where when the computer program is executed by a processor, the method as described in any one of the above embodiments is implemented.

It can be understood that, when an image has a relatively large size, the effect of increasing the defect detection speed in the above embodiments is more obvious. For example, the image has a size of 16K.

After mass production testing on a hardware platform (for example, 16-core CPU i9-9900K or NVIDIA RTX5000 GPU), a processing time for a 16K image is not greater than 100 ms in a process of defect detection using the defect detection method in the above embodiment, and no missed detection occurs.

So far, the embodiments of the present application have been described in detail. Some details well known in the art are not described in order to avoid obscuring the concept of the present application. Based on the foregoing description, a person skilled in the art can fully understand how to implement the technical solutions disclosed herein.

A person skilled in the art should understand that the embodiments of the present application may be provided as methods, systems, or computer program products. Therefore, the present application may use a form of hardware-only embodiments, software-only embodiments, or embodiments with a combination of software and hardware. Furthermore, the present application may be in a form of a computer program product implemented on one or more computer-usable non-transient storage media (including, but not limited to, a magnetic disk memory, a CD-ROM, an optical memory, etc.) including computer-usable program code.

The present application is described with reference to flowcharts and/or block diagrams of the method, the device (system), and the computer program product in the embodiments of the present application. It should be understood that functions specified in one or more procedures in the flowcharts and/or one or more blocks in the block diagrams can be implemented by computer program instructions. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the processor of the computer or another programmable data processing device.

These computer program instructions may also be stored in a computer-readable memory that can guide a computer or another programmable data processing device to work in a specific manner, so that the instructions stored in the computer-readable memory generate an article of manufacture including an instructing apparatus, where the instructing apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable device to generate computer-implemented processing, and instructions executed on the computer or another programmable device provide steps for implementing functions specified in one or more procedures in the flowcharts and/or one or more blocks in the block diagrams.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A method for detecting defects, comprising:

obtaining an average grayscale value of an image of an object to be detected;

constructing a mapping table, wherein elements of the mapping table comprise a mapped value corresponding to each grayscale value within a grayscale value range of the image, a mapped value corresponding to any grayscale value greater than or equal to a reference value is a first value, a mapped value corresponding to any grayscale value less than the reference value is a second value, and the reference value is an absolute value of a difference between the average grayscale value and a preset grayscale value;

searching for a mapped value corresponding to a grayscale value of each pixel in the image from the mapping table;

segmenting the image to obtain at least one suspicious defect sub-image based on the mapped value corresponding to the grayscale value of each pixel, wherein a mapped value corresponding to a grayscale value of each pixel in each suspicious defect sub-image is the first value; and inputting the at least one suspicious defect sub-image into a machine learning model to obtain a defect detection result.

2. The method according to claim 1, wherein obtaining the average grayscale value of the image of the object to be detected comprises:

obtaining an original grayscale value range of the image; and performing contrast stretching on the image to expand the original grayscale value range to the grayscale value range, wherein the average grayscale value is an average grayscale value of the image after being subjected to the contrast stretching.

3. The method according to claim 2, wherein performing the contrast stretching on the image comprises:

converting the original grayscale value I1(x,y) of each pixel in the image into a grayscale value I2(x,y) according to the following formula:

$$I2(x,y)=\begin{cases} c, & I1(x,y)<a \\ d, & I1(x,y)>b \\ \frac{I1(x,y)-a}{b-a}\cdot(d-c), & a\le I1(x,y)\le b \end{cases}$$

wherein a is a lower limit of the original grayscale value range, b is an upper limit of the original grayscale value range, c is a lower limit of the grayscale value range, and d is an upper limit of the grayscale value range.

4. The method according to claim 3, wherein the first value is d, and the second value is c.

5. The method according to claim 3, wherein c=0, and d=255.

6. The method according to claim 1, wherein the machine learning model comprises a residual neural network model, and a total number of convolutional layers and fully connected layers in the residual neural network model is 14.

7. The method according to claim 6, wherein a difference between a maximum original grayscale value and a minimum original grayscale value of a non-defect region, other than the defect, in the image ranges from 35 to 50.

8. The method according to claim 7, wherein the difference between the maximum original grayscale value and the minimum original grayscale value is 40.

9. The method according to claim 8, wherein the maximum original grayscale value is 105, and the minimum original grayscale value is 75.

10. The method according to claim 1, wherein segmenting the image to obtain at least one suspicious defect sub-image based on the mapped value corresponding to the grayscale value of each pixel comprises:

segmenting the image to obtain a plurality of connected regions based on the mapped value corresponding to the grayscale value of each pixel, wherein a mapped value corresponding to a grayscale value of each pixel in each connected region is the first value;

in a case where two adjacent connected regions satisfy a preset condition, combining the two connected regions into a suspicious defect sub-image, wherein areas of the two connected regions are respectively a first area and a second area less than or equal to the first area, an area of an overlapped region of the two connected regions is a third area, and the preset condition comprises a ratio of the third area to the first area being greater than a preset ratio; and in a case where the two connected regions do not satisfy the preset condition, determining the two connected regions as two suspicious defect sub-images.

11. The method according to claim 10, wherein the preset ratio is greater than 0.5 and less than 1.

12. The method according to claim 11, wherein the preset ratio is 0.8.

13. The method according to claim 1, wherein a data type of an element in the mapping table is an unsigned char type.

14. The method according to claim 1, wherein the defect detection result comprises a defect type.

15. The method according to claim 1, wherein the object to be detected comprises an electrode plate of a battery.

16. The method according to claim 15, wherein the battery comprises a lithium battery.

17. A defect detection apparatus, comprising:

an obtaining module, configured to obtain an average grayscale value of an image of an object to be detected;

a construction module, configured to construct a mapping table, wherein elements of the mapping table comprise a mapped value corresponding to each grayscale value within a grayscale value range of the image, a mapped value corresponding to any grayscale value greater than or equal to a reference value is a first value, a mapped value corresponding to any grayscale value less than the reference value is a second value, and the reference value is an absolute value of a difference between the average grayscale value and a preset grayscale value;

a search module, configured to search for a mapped value corresponding to a grayscale value of each pixel in the image from the mapping table;

a segmentation module, configured to segment the image to obtain at least one suspicious defect sub-image based on the mapped value corresponding to the grayscale value of each pixel, wherein a mapped value corresponding to a grayscale value of each pixel in each suspicious defect sub-image is the first value; and an input module, configured to input the at least one suspicious defect sub-image into a machine learning model to obtain a defect detection result.

18. A defect detection apparatus, comprising:

a memory; and a processor coupled to the memory and configured to execute, based on instructions stored in the memory, the method according to claim 1.

19. A defect detection system, comprising:

the defect detection apparatus according to claim 17; and an imaging apparatus, configured to scan the object to be detected, to obtain the image.

20. A non-transitory computer-readable storage medium storing computer program instructions, wherein when executed by a processor, the computer program causes the processor to perform a defect detection method that comprises:

obtaining an average grayscale value of an image of an object to be detected;

constructing a mapping table, wherein elements of the mapping table comprise a mapped value corresponding to each grayscale value within a grayscale value range of the image, a mapped value corresponding to any grayscale value greater than or equal to a reference value is a first value, a mapped value corresponding to any grayscale value less than the reference value is a second value, and the reference value is an absolute value of a difference between the average grayscale value and a preset grayscale value;

searching for a mapped value corresponding to a grayscale value of each pixel in the image from the mapping table;

segmenting the image to obtain at least one suspicious defect sub-image based on the mapped value corresponding to the grayscale value of each pixel, wherein a mapped value corresponding to a grayscale value of each pixel in each suspicious defect sub-image is the first value; and inputting the at least one suspicious defect sub-image into a machine learning model to obtain a defect detection result.

* * * * *